United States Patent [19]

Vongeheur

[11] Patent Number: 4,546,005

[45] Date of Patent: Oct. 8, 1985

[54] METHOD FOR POURING CONFECTIONERY SOLUTION

[75] Inventor: Hermann-Otto Vongeheur, Neuwied, Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 484,308

[22] Filed: Apr. 12, 1983

[30] Foreign Application Priority Data

May 11, 1982 [DE] Fed. Rep. of Germany ....... 3217582

[51] Int. Cl.⁴ .......................... A23G 3/12; A23G 3/00
[52] U.S. Cl. .................................... 426/660; 426/512; 426/515
[58] Field of Search ............... 426/660, 661, 512, 515, 426/418

[56] References Cited

U.S. PATENT DOCUMENTS

| | | | |
|---|---|---|---|
| 2,480,935 | 9/1949 | Kempf et al. | 426/660 |
| 3,371,626 | 3/1968 | Hachtman | 426/515 |
| 4,056,640 | 11/1977 | Otto | 426/660 |
| 4,262,029 | 4/1981 | Kleiner et al. | 426/660 |
| 4,450,179 | 5/1984 | Vink et al. | 426/660 |

Primary Examiner—Jeanette Hunter

[57] ABSTRACT

Confectionery solution containing gelling agents such as agar-agar, tends very markedly to form streamers or tails when being poured. The formation of tails or streamers is inhibited in accordance with the invention by the atmosphere in the environment of the pouring region being maintained at (a) a temperature at least equal to the temperature of the confectionery solution and (b) a moisture content at least equal to the equilibrium moisture of the confectionery solution.

2 Claims, 1 Drawing Figure

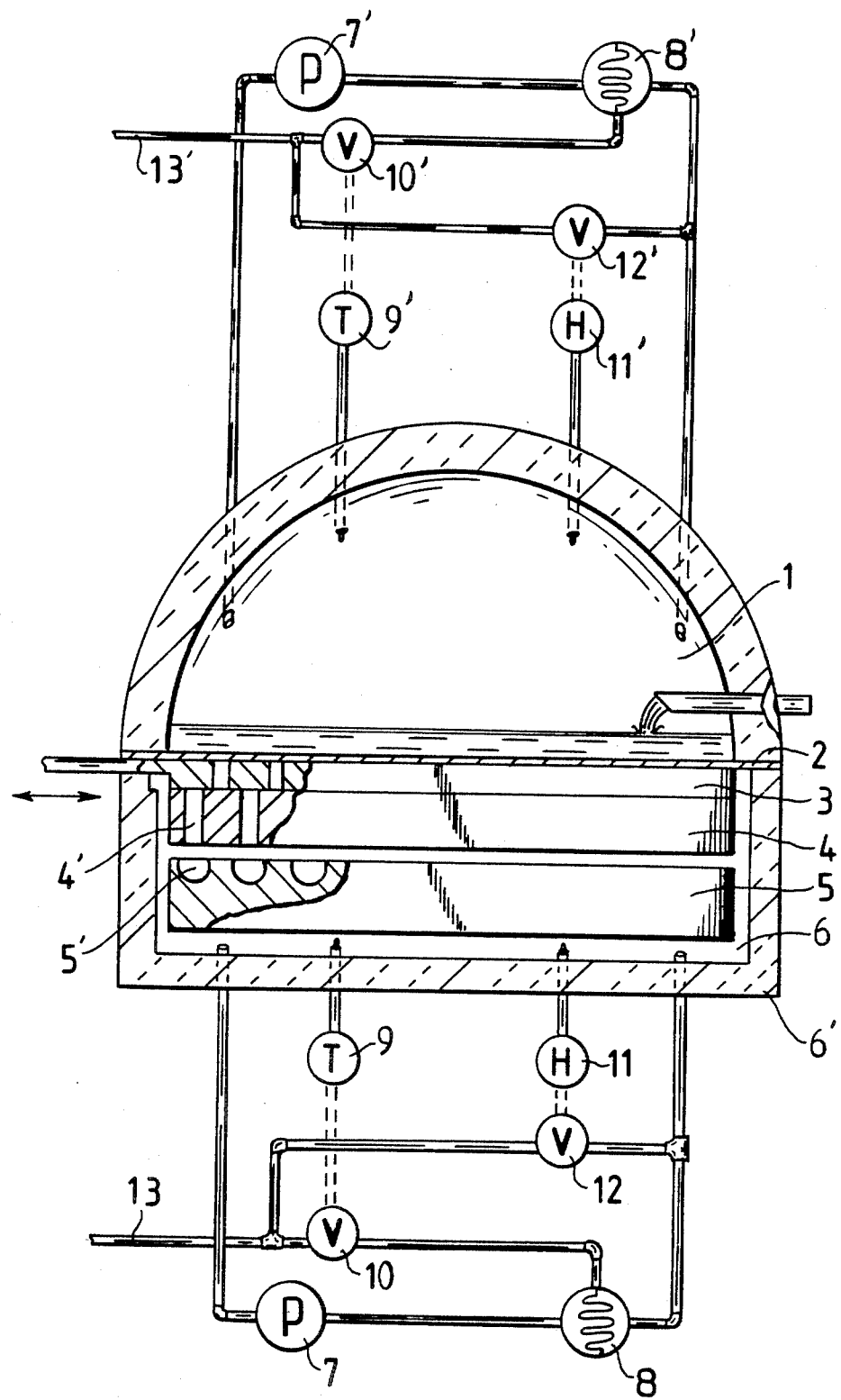

METHOD FOR POURING CONFECTIONERY SOLUTION

The invention relates to a method of pouring confectionery solution into mold recesses, and to an apparatus for performing the process. More particularly, the invention relates to a pouring process for the pouring devices of mogul apparatuses.

Pouring devices for mogul apparatuses have been known in the confectionery industry for many decades and have become standardized to a considerable extent during this lengthy period. More particularly, a pouring device of this kind comprises a supply tank from which the confectionery solution to be poured is supplied, either by the positive pressure in the boiler itself or by a large number of small reciprocating pumps. The solution is fed from the tank through a control valve to a nozzle plate having a number of nozzles.

Difficulties occur with these briefly described standard pouring devices when they are required to process confectionery solutions containing gelling agents such as gum Arabic, gelatin, agar-agar or the like. This is because such agents tend, upon the termination of pouring, to form on the exit side of the nozzles a filament which not only is detrimental to the shape of the end product, but also tends to soil the molds, and in extreme cases, may even disturb operation.

It has previously been assumed that the tendency to the formation of filaments increases, with a given kind of confectionery solution, as viscosity increases. Conventionally, therefore, endeavors have been directed to ensuring that viscosity remains very low during pouring. The viscosity of the confectionery solution can be controlled to some extent through its temperature, the viscosity of the solution decreasing as its temperature increases. However, the limit to viscosity adjustment by temperature is soon reached due to the loss of quality entailed by heating of the solution, as a result of the saccharose decomposing. Another way of reducing viscosity is to increase the water content of the confectionery solution. This, of course, assumes that the molds can receive the surplus water after pouring. In actual fact this is true only for powder molds; powderless mogul plants would be unsuitable for processing such compositions.

Another substantial disadvantage of pouring confectionery solutions with the use of an excess of water is that such excess prolongs the gelling time of the solution considerably; for instance, the gelling time of confectionery poured without excess of water is less than 1 hour whereas the drying time of confectionery poured with an excess of water may, in some cases, be several days. To this end, the mold powder boxes and their contents must be kept in air-conditioned facilities at a temperature of 60° C. for this long period.

Consequently, a confectioner wishing to produce gelling-agent-containing confectionery by means of conventional pouring methods—i.e., pouring with an excess of water—must have available a supply of mold powder and mold powder boxes suffient for several days' production. The confectioner must also have air-conditioned facilities available in which the production remains for several days, and this obviously entails substantial expenditures for the energy consumed by the air-conditioned facilities.

It is therefore the object of the invention to provide an improved method of pouring a confectionery solution without excess of water—i.e., for pouring in the composition of the end product—and an apparatus for the practice of the method.

This object is achieved according to the invention, by maintaining the atmosphere contacting the confectionery solution at:

(a) a temperature at least equal to the temperature of the confectionery solution; and (b) a moisture content at least equal to the equilibrium moisture of the confectionery solution. Surprisingly, tests have shown that it is not so much the viscosity in itself, as the tendency of the confectionery solution to form a skin that is responsible for the streamers or filaments or the like.

When ambient air at ordinary room temperature and ordinary moisture content contacts a hot confectionery solution whose composition is the same as the composition of the end product, a skin begins to form immediately on the solution surface. This skin formation is due partly to cooling and partly to the removal of water—i.e., because the solution surface starts to dry.

If skin formation of this kind occurs before the pouring nozzles, for instance, in the boiler, the nozzles may become jammed. If skin formation occurs on the exit side of the nozzle, a kind of hose is formed which extends around the pouring cone and after termination of pouring forms the filament.

If the formation of skin can be obviated, the tenency for such filaments to form is reduced. The method according to the invention solves this problem in a simple way.

The ambient air which is heated and kept moist in accordance with the aforementioned novel conditions precludes cooling or drying-out and, therefore, any skin formation and its attendant disturbances of the kind described, such as clogging of the nozzles and the formation of filaments.

As previously stated, the underlying concept of the method according to the invention is to obviate the formation of skin on the confectionery solution. To this end, the air contacting the confectionery solution is maintained at a temperature at least equal to that of the confectionery solution to be poured, the moisture content of such air being at least equal to the equilibrium moisture of the confectionery solution.

The method is performed using a pouring device having all the features of conventional pouring devices but with facilities to control the air humidity and air temperature.

Other objects and features of the present invention will become apparent from the following detailed description when considered in connection with the accompanying drawing which discloses one embodiment of the invention. It is to be understood that the drawing is designed for the purpose of illustration only and not intended as a definition of the limits in scope of the invention.

The drawing is a partially-schematic, sectional view through a pouring device and a conditioning chamber disposed therebelow embodying the present invention.

In the embodiment of the apparatus shown in the drawing, a pressure boiler pouring device is employed since devices of this kind have advantages over piston pump apparatuses for the processing of highly viscous substances.

The pouring device mainly comprises a boiler 1 which is supplied with compressed air and which is closed by a bottom plate 2 in contiguous relationship with a slide plate 3; disposed therebelow is a nozzle plate 4 having a number of discharge nozzles 4'. Disposed below nozzle plate 4 is a conveyor (not shown) on which mold carriers 5 having pouring molds 5' move through below the pouring device, the confectionery solution for pouring being introduced through the nozzles 4' into the molds 5'.

Unlike conventional pouring devices, the device according to the invention has a conditioning chamber 6 which extends around the nozzle plate 4 and is large enough to receive the mold carriers 5 moving through below the nozzle plate 4.

The conditioning chamber 6 mainly comprises heat-insulated walls 6' and entries and exits (not shown) for the arrival and departure of the mold carriers 5, such entries and exits being in the form of locks in order to reduce heat losses.

The air in the chamber 6 is circulated continuously by a pump 7 and passed through a heat exchanger 8. A temperature sensor 9 records the temperature in the chamber 6 and opens or closes a steam valve 10 as required through which live steam is supplied to the heat exchanger 8.

The humidity content of the air is controlled in a similar fashion. A humidity sensor 11 records the humidity content of the air in the chamber 6 and adjusts it automatically by way of a valve 12 for varying the steam mixed with the warm air, which steam is supplied from the boiling plant (not shown) via line 13.

The means for controlling air temperature and air humidity in the boiler operate in just the same way as has been described with reference to the control of the temperature and humidity of the air in the conditioning chamber 6.

As in the chamber 6, the air in the boiler is circulated continuously by a pump 7' through a heat exchanger 8'. Through the agency of a temperature sensor 9' and a humidity sensor 11' and associated valves 10', 12' respectively actuated thereby, the air temperature and the air humidity are adjusted by a supply of steam to the heat exchanger 8' or by the introduction of steam into the boiler. In this case too, the steam is derived from the boiling plant via a line 13'.

While only one embodiment has been shown and described, it is obvious that many changes and modifications may be made thereunto without departing from the spirit and scope of the invention.

What is claimed is:

1. A method of molding confectionary solution, comprising the step of pouring a confectionary solution into a mold while maintaining the atmosphere contacting the confectionary solution at a temperature at least substantially equal to the temperature of the confectionary solution and a moisture content at least substantially equal to the equilibrium moisture of the confectionary solution.

2. The method of claim 1, wherein said pouring step includes pouring said confectionary solution from a boiler into a multiplicity of molds in a mold carrier via a nozzle plate having a multiplicity of nozzle openings, and wherein said atmosphere contacting said confectionary solution includes the atmosphere in said pouring boiler and in the region between said nozzle plate and said mold carrier.

* * * * *